(12) United States Patent
Tokunaga et al.

(10) Patent No.: US 10,337,560 B2
(45) Date of Patent: Jul. 2, 2019

(54) SLIDING COMPONENT

(71) Applicant: EAGLE INDUSTRY CO., LTD., Minato-ku, Tokyo (JP)

(72) Inventors: Yuichiro Tokunaga, Tokyo (JP); Hideyuki Inoue, Tokyo (JP); Wataru Kimura, Tokyo (JP); Tetsuya Iguchi, Tokyo (JP); Keiichi Chiba, Tokyo (JP); Masatoshi Itadani, Tokyo (JP); Hikaru Katori, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/573,107

(22) PCT Filed: May 13, 2016

(86) PCT No.: PCT/JP2016/064229
§ 371 (c)(1),
(2) Date: Nov. 9, 2017

(87) PCT Pub. No.: WO2016/186015
PCT Pub. Date: Nov. 24, 2016

(65) Prior Publication Data
US 2018/0135699 A1 May 17, 2018

(30) Foreign Application Priority Data
May 20, 2015 (JP) .................... 2015-102472

(51) Int. Cl.
*F16J 15/40* (2006.01)
*F16C 33/80* (2006.01)
*F16J 15/34* (2006.01)

(52) U.S. Cl.
CPC ............ *F16C 33/80* (2013.01); *F16J 15/348* (2013.01); *F16J 15/3416* (2013.01)

(58) Field of Classification Search
CPC .......... F16J 15/34; F16J 15/3412; F16C 33/80
See application file for complete search history.

(56) References Cited

U.S. PATENT DOCUMENTS

| 2013/0209011 | A1* | 8/2013 | Tokunaga | F16C 17/045 384/123 |
| 2015/0260292 | A1* | 9/2015 | Inoue | F16J 15/3412 277/400 |
| 2016/0033045 | A1* | 2/2016 | Itadani | F16J 15/348 277/348 |

FOREIGN PATENT DOCUMENTS

| JP | S6231775 A | 2/1987 |
| JP | S62117360 U | 7/1987 |

(Continued)

OTHER PUBLICATIONS

International Search Report (ISR) dated Jul. 12, 2016, issued for International application No. PCT/JP2016/064229.

*Primary Examiner* — Gilbert Y Lee
(74) *Attorney, Agent, or Firm* — Law Office of Katsuhiro Arai (57) ABSTRACT

In an embodiment, a sliding face of at least one sliding part of the pair of sliding parts is provided, along its entire circumference, with a trap groove 10 for trapping leakage fluid, located on a leakage side and spaced from the leakage side by a land. A dust entry reduction means 12 for reducing entry of dust from the leakage side while allowing passage of fluid is formed between lands of the pair of sliding parts on the leakage side of the trap groove 10. At the sliding faces of the pair of sliding parts sliding relatively, entry of dust from the leakage side as well as liquid leakage to the leakage side are suppressed.

15 Claims, 7 Drawing Sheets

(56) References Cited

FOREIGN PATENT DOCUMENTS

| JP | H01139175 U | 9/1989 |
| JP | H08303606 A | 11/1996 |
| JP | 2001012610 A | 1/2001 |
| JP | 2005337503 A | 12/2005 |

* cited by examiner

SLIDING COMPONENT

This application is the U.S. National Phase under 35 U.S.C. § 371 of International Application PCT/JP2016/064229, filed May 13, 2016, which claims priority to Japanese Patent Application No. 2015-102472, filed May 20, 2015. The International Application was published under PCT Article 21(2) in a language other than English.

TECHNICAL FIELD

The present invention relates to sliding components suitable for, for example, mechanical seals, bearings, and other sliding units. In particular, the present invention relates to sliding components such as seal rings required to reduce friction by interposing fluid between sliding faces and prevent leakage of fluid from the sliding faces, e.g. oil seals used in gearboxes for turbochargers or for aircraft engines, or bearings.

BACKGROUND ART

A mechanical seal, an example of a sliding component, is evaluated in its performance by a leakage rate, a wear rate, and torque. In conventional techniques, by optimizing the sliding materials and the sliding face roughness of mechanical seals, their performance is increased to achieve low leakage, long life, and low torque. However, due to growing awareness of environmental problems in recent years, a further improvement in the performance of mechanical seals has been demanded, and technology development beyond the limits of the conventional techniques has been required.

Under such circumstances, as one used in an oil seal device for a rotating component such as a turbocharger, for example, a known one includes a rotating shaft rotatably placed in a housing, a disk-shaped rotor rotating with the rotating shaft, and a disk-shaped stationary body that is fixed to the housing and abuts on an end face of the rotor to prevent leakage of oil from the outer peripheral side to the inner peripheral side, the stationary body having an abutment face provided with an annular groove for generating positive pressure by the centrifugal force of fluid, to prevent leakage of oil from the outer peripheral side to the inner peripheral side (see Patent Document 1, for example).

Another known one in a rotating shaft seal device for sealing toxic fluid, for example, includes a rotating ring with a rotating shaft and a stationary ring mounted to a casing, one of the rotating ring and the stationary ring having a sliding face provided with a spiral groove with an end on the high-pressure side being in a dead-end shape, for drawing in liquid on the low-pressure side toward the high-pressure side by rotation of the rotating ring, to prevent leakage of sealed fluid on the high-pressure side to the low-pressure side (see Patent Document 2, for example).

Another known one as a face seal structure suitable for sealing a drive shaft of a turbocharger against a compressor housing, for example, has a pair of seal rings working together, one being provided as a rotating component and the other being provided as a stationary component, the seal rings each having a sliding face formed substantially radially, and forming, between the sliding faces, a seal gap for sealing an area provided outward of the sliding faces against an area provided inward of the sliding faces during operation, at least one of the sliding faces being provided with a plurality of circumferentially spaced recessed portions effective for feeding gas, the recessed portions extending from one peripheral edge of the sliding face toward the other peripheral edge, the recessed portions having inner ends radially spaced from the other peripheral edge of the sliding face, to seal a non-gas component in a gas medium containing the non-gas component (see Patent Document 3, for example).

CITATION LIST

Patent Documents

Patent Document 1: JP 62-117360 U
Patent Document 2: JP 62-31775 A
Patent Document 3: JP 2001-12610 A

SUMMARY OF THE INVENTION

Problem to be Solved by the Invention

Figures 7A, 7B:
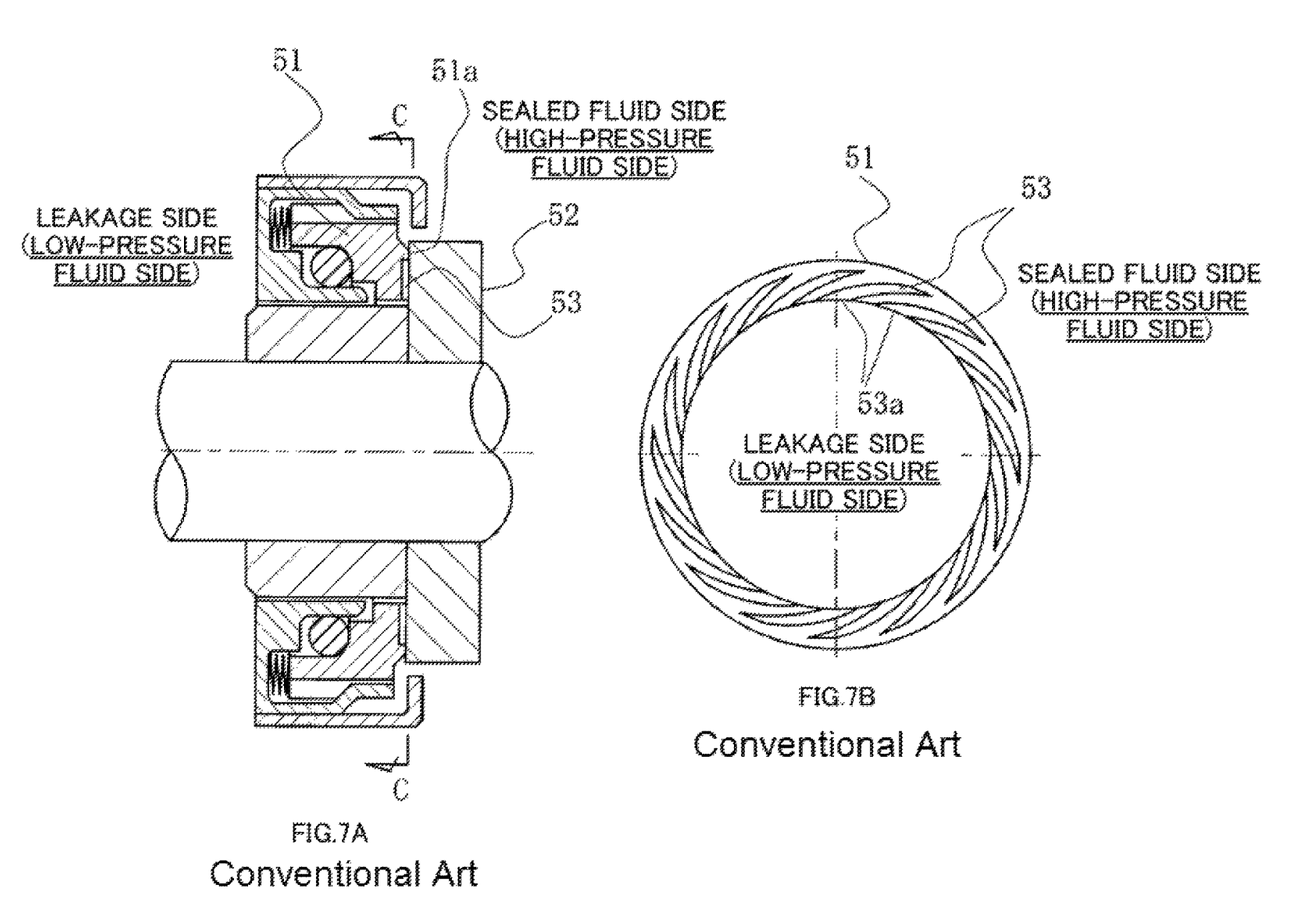
FIG. 7A is a vertical cross-sectional view.
FIG. 7B is a cross sectional view taken along arrow C-C.

However, in the conventional techniques described in Patent Documents 1 to 3 described above, as illustrated in FIG. 7, for example, there is a problem that dust easily enters a sliding face 51a of a stationary ring 51 from the leakage side because spiral grooves 53 for drawing in fluid on the low-pressure fluid side (hereinafter, sometimes referred to as a "leakage side") toward the sealed-fluid side (high-pressure fluid side) by rotation of a rotating ring 52 have leakage-side ends 53a directly open to the leakage side. There is another problem that when sliding faces of the stationary ring 51 and the rotating ring 52 open due to vibrations at the time of unsteady operation of the device or the like, leakage liquid directly flows out to the outside of the device because no measure is taken against liquid leakage.

The present invention has an object of providing a sliding component capable of improving both conflicting functions of sealing and lubrication of sliding faces of a pair of sliding parts sliding relatively by preventing the entry of dust from the leakage side into the sliding faces and preventing fluid leakage to the leakage side at the sliding faces.

Means for Solving Problem

To attain the above object, a sliding component according to a first aspect of the present invention includes a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking, wherein the sliding face of at least one sliding part of the pair of sliding parts is provided, along an entire circumference thereof, with at least one trap groove located on a leakage side and spaced from the leakage side by a land, for trapping leakage fluid, and a dust entry reduction means is formed between lands of the pair of sliding parts on the leakage side of the at least one trap groove, for reducing entry of dust from the leakage side while allowing passage of fluid.

According to this aspect, even when the sliding faces of the rotating-side seal ring and the stationary-side seal ring open due to vibrations at the time of unsteady operation of the device or the like, the at least one trap groove can trap leakage fluid, preventing fluid leakage to the leakage side, and the entry of dust from the leakage side into the sliding faces can be reduced, and thus friction and leakage at the sliding faces can be reduced.

According to a second aspect of the present invention, a sliding component includes a pair of sliding parts that relatively slide on each other, one of the sliding parts being a stationary-side seal ring, the other of the sliding parts being a rotating-side seal ring, the seal rings each having a sliding face formed radially for sealing liquid or misty fluid, which is sealed fluid, from leaking, wherein the sliding face of at least one sliding part of the pair of sliding parts is provided, along an entire circumference thereof, with at least one trap groove located on a leakage side and spaced from the leakage side by a land, for trapping leakage liquid, and a dust entry reduction means is formed between lands of the pair of sliding parts on the leakage side of the at least one trap groove, for reducing entry of dust from the leakage side.

According to this aspect, even when the sliding faces of the rotating-side seal ring and the stationary-side seal ring open due to vibrations at the time of unsteady operation of the device or the like, the at least one trap groove can trap leakage liquid, preventing liquid leakage to the leakage side, and the entry of dust from the leakage side into the sliding faces can be reduced, and thus friction and leakage at the sliding faces can be reduced.

According to a third aspect of the present invention, in the sliding component in the first or second aspect, the dust entry reduction means includes an extremely small gap zone formed between the lands of the pair of sliding parts on the leakage side of the at least one trap groove.

According to this aspect, a simple configuration can reduce the entry of dust from the leakage side into the sliding faces.

According to a fourth aspect of the present invention, in the sliding component in the first or second aspect, the dust entry reduction means includes radial inclined grooves formed in a surface of at least one of the lands of the pair of sliding parts on the leakage side of the at least one trap groove.

According to this aspect, the entry of dust from the leakage side into the sliding faces can be further reduced.

According to a fifth aspect of the present invention, in the sliding component in any one of the first to fourth aspects, the at least one trap groove includes a plurality of trap grooves provided in one of the stationary-side seal ring and the rotating-side seal ring and at least one trap groove provided in the other of the stationary-side seal ring and the rotating-side seal ring, and the trap groove or grooves in the stationary-side seal ring and the trap groove or grooves in the rotating-side seal ring are arranged so as not to radially overlap with one another, and the trap grooves are defined by lands between which dust entry reduction means are formed for reducing entry of dust from the leakage side while allowing passage of fluid.

According to this aspect, even when the sliding faces of the rotating-side seal ring and the stationary-side seal ring open due to vibrations at the time of unsteady operation of the device or the like, the plurality of trap grooves can trap leakage liquid, further preventing liquid leakage to the leakage side, and the plurality of dust entry reduction means can prevent the entry of dust, further reducing the entry of dust from the leakage side into the sliding faces.

According to a sixth aspect of the present invention, in the sliding component in any one of the first to fifth aspects, the sliding face of at least one sliding part of the pair of sliding parts is further provided with at least one dynamic pressure generation groove that is configured to communicate with the at least one trap groove and not to communicate with a sealed fluid side.

According to this aspect, in a high-speed rotation state of the rotating-side seal ring such as in steady operation, gas is sucked from the leakage side, generating dynamic pressure (positive pressure) in the vicinity of an end on the outer peripheral side. Consequently, a slight gap is formed between the sliding faces of the rotating-side seal ring and the stationary-side seal ring, bringing the sliding faces into a state of gas lubrication and very low friction. Since the at least one dynamic pressure generation groove is configured not to communicate with the sealed fluid side, leakage does not occur during rest.

According to a seventh aspect of the present invention, in the sliding component in the sixth aspect, the at least one dynamic pressure generation groove is formed into a spiral shape to suck fluid on the leakage side and pump the fluid to the sealed fluid side.

According to this aspect, gas on the inner peripheral side and liquid in the at least one trap groove are pumped toward the outer peripheral side, so that the liquid in the trap groove and liquid on the outer peripheral side are prevented from leaking to the inner peripheral side.

According to an eighth aspect of the present invention, in the sliding component in any one of the first to seventh aspects, the sliding face of at least one sliding part of the pair of sliding parts is provided with at least one fluid introduction groove that is configured to communicate with the sealed fluid side and not to communicate with the leakage side.

According to this aspect, in a low-speed rotation state of the rotating-side seal ring such as at the time of startup, sealed fluid can be actively introduced into the sliding faces to lubricate the sliding faces. During high-speed rotation of the rotating-side seal ring such as during steady operation, the liquid introduced into the sliding faces through the at least one fluid introduction groove is discharged by centrifugal force, and thus the liquid does not leak to the inner peripheral side, the leakage side.

EFFECTS OF THE INVENTION

The present invention achieves the following outstanding effects:

(1) The sliding face of at least one sliding part of the pair of sliding parts is provided, along the entire circumference thereof, with the at least one trap groove located on the leakage side and spaced from the leakage side by the land, for trapping leakage fluid, and the dust entry reduction means is formed between the lands of the pair of sliding parts on the leakage side of the at least one trap groove, for reducing the entry of dust from the leakage side while allowing the passage of fluid, so that even when the sliding faces of the rotating-side seal ring and the stationary-side seal ring open due to vibrations at the time of unsteady operation of the device or the like, the at least one trap groove can trap leakage fluid, preventing fluid leakage to the leakage side, and the entry of dust from the leakage side into the sliding faces can be reduced, and thus friction and leakage at the sliding faces can be reduced.

(2) The sliding face of at least one sliding part of the pair of sliding parts is provided, along the entire circumference thereof, with the at least one trap groove located on the leakage side and spaced from the leakage side by the land, for trapping leakage liquid, and the dust entry reduction means is formed between the lands of the pair of sliding parts on the leakage side of the at least one trap groove, for reducing the entry of dust from the leakage side, so that even when the sliding faces of the rotating-side seal ring and the stationary-side seal ring open due to vibrations at the time of unsteady operation of the device or the like, the at least one trap groove can trap leakage liquid, preventing liquid leakage to the leakage side, and the entry of dust from the leakage side into the sliding faces can be reduced, and thus friction and leakage at the sliding faces can be reduced.

(3) The dust entry reduction means includes the extremely small gap zone formed between the lands of the pair of sliding parts on the leakage side of the at least one trap groove, so that a simple configuration can reduce the entry of dust from the leakage side into the sliding faces.

(4) The dust entry reduction means includes the radial inclined grooves formed in the surface of the at least one of the lands of the pair of sliding parts on the leakage side of the at least one trap groove, so that the entry of dust from the leakage side into the sliding faces can be further reduced.

(5) The at least one trap groove includes the plurality of trap grooves provided in one of the stationary-side seal ring and the rotating-side seal ring and the at least one trap groove provided in the other of the stationary-side seal ring and the rotating-side seal ring, the trap groove or grooves in the stationary-side seal ring and the trap groove or grooves in the rotating-side seal ring are arranged so as not to radially overlap with one another, and the trap grooves are defined by the lands between which the dust entry reduction means are formed for reducing the entry of dust from the leakage side while allowing the passage of fluid, so that even when the sliding faces of the rotating-side seal ring and the stationary-side seal ring open due to vibrations at the time of unsteady operation of the device or the like, the plurality of trap grooves can trap leakage liquid, further preventing liquid leakage to the leakage side, and the plurality of dust entry reduction means can prevent the entry of dust, further reducing the entry of dust from the leakage side into the sliding faces.

(6) The sliding face of at least one sliding part of the pair of sliding parts is further provided with the at least one dynamic pressure generation groove that is configured to communicate with the at least one trap groove and not to communicate with the sealed fluid side, so that in a high-speed rotation state of the rotating-side seal ring such as in steady operation, gas is sucked from the leakage side, generating dynamic pressure (positive pressure) in the vicinity of the end on the outer peripheral side. Consequently, a slight gap is formed between the sliding faces of the rotating-side seal ring and the stationary-side seal ring, bringing the sliding faces into a state of gas lubrication and very low friction. Since the at least one dynamic pressure generation groove is configured not to communicate with the sealed fluid side, leakage does not occur during rest.

(7) The at least one dynamic pressure generation groove is formed into a spiral shape to suck fluid on the leakage side and pump the fluid to the sealed fluid side, so that gas on the inner peripheral side and liquid in the at least one trap groove are pumped toward the outer peripheral side. Consequently, the liquid in the at least one trap groove and liquid on the outer peripheral side are prevented from leaking to the inner peripheral side.

(8) The sliding face of at least one sliding part of the pair of sliding parts is provided with the at least one fluid introduction groove that is configured to communicate with the sealed fluid side and not to communicate with the leakage side, so that in a low-speed rotation state of the rotating-side seal ring such as at the time of startup, sealed fluid can be actively introduced into the sliding faces to lubricate the sliding faces S. During high-speed rotation of the rotating-side seal ring such as during steady operation, the liquid introduced into the sliding faces through the at least one fluid introduction groove is discharged by centrifugal force, and thus the liquid does not leak to the inner peripheral side, the leakage side.

BRIEF DESCRIPTION OF THE DRAWINGS

FIGS. 7A and 7B are explanatory views for explaining the conventional techniques.

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise explicitly described.

First Embodiment

Figure 1:
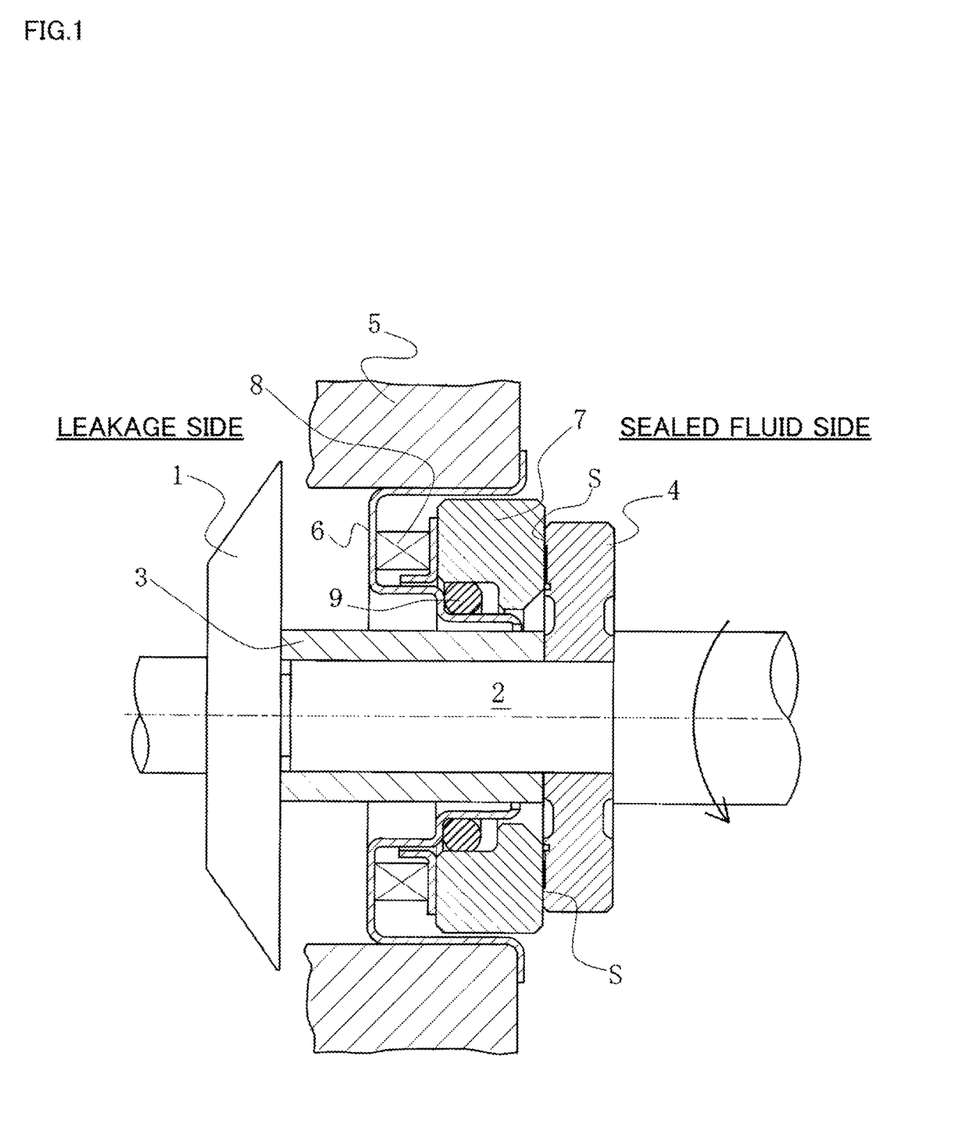
FIG. 1 is a vertical cross-sectional view showing an example of a mechanical seal according to a first embodiment of the present invention.
Figure 2A:
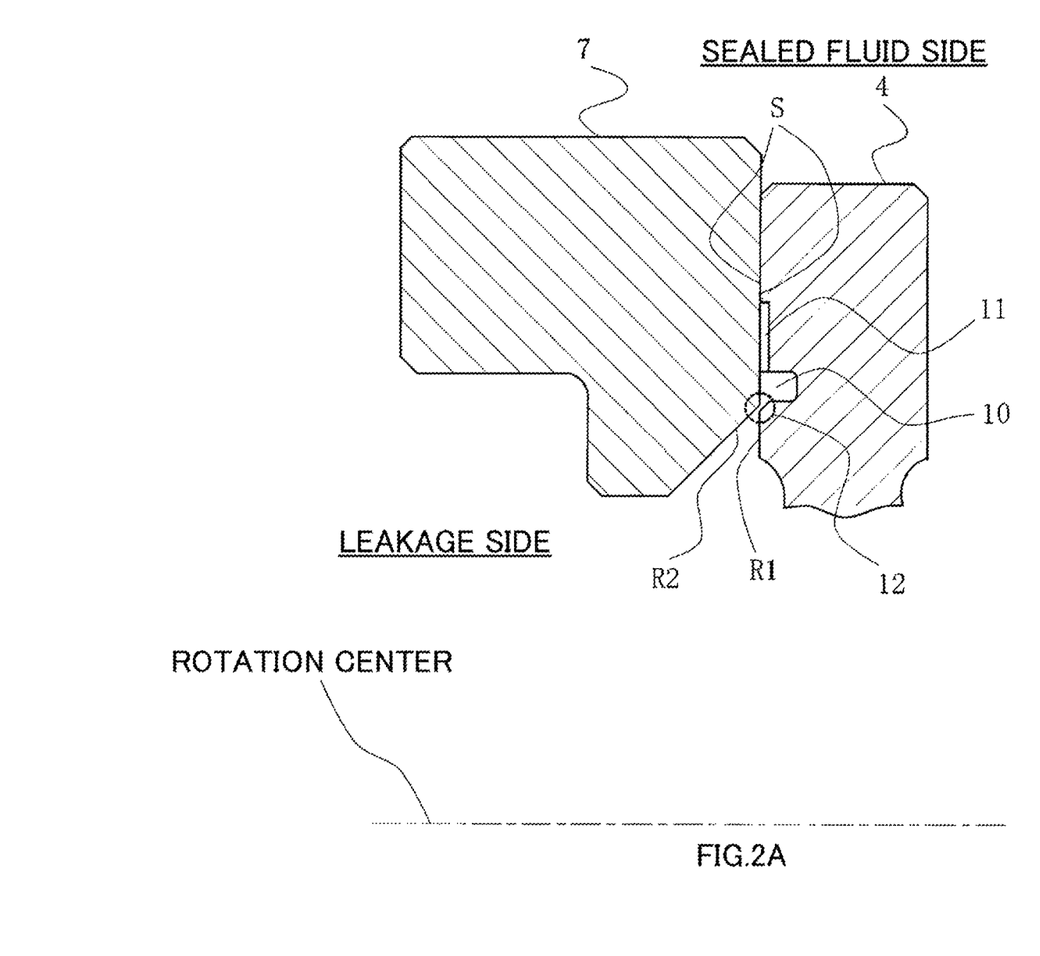
FIG. 2A is an enlarged view showing sliding portions of sliding parts according to the first embodiment of the present invention, with a rotation center positioned horizontally in a lower part of the sheet.
Figure 2B:
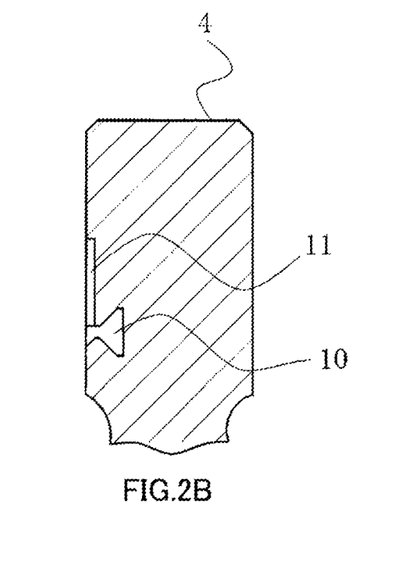
FIG. 2B shows a modification of a trap groove.
Figure 3A:
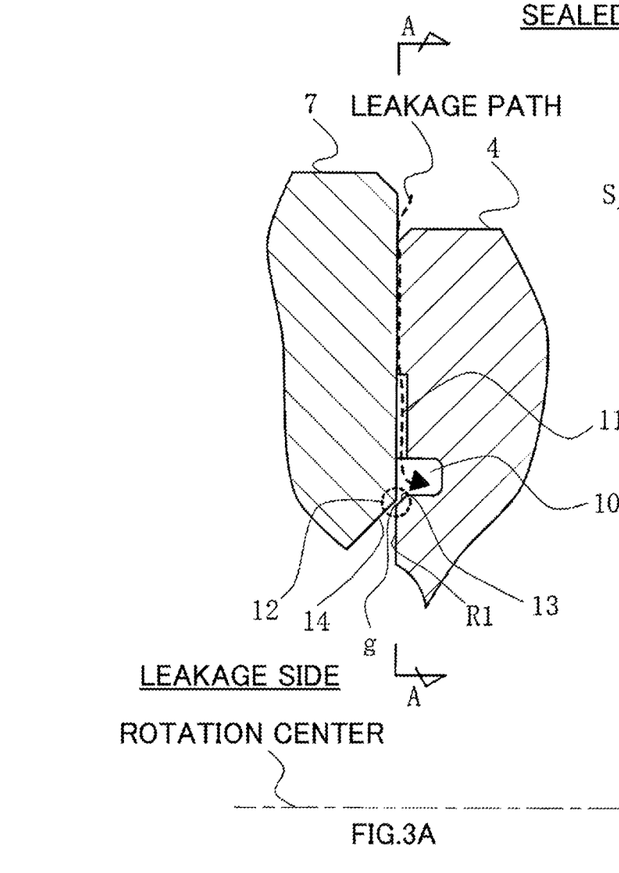
FIG. 3A shows the sliding portions in FIG. 2A further enlarged, with the rotation center present horizontally in a lower part of the sheet.
Figure 3B:
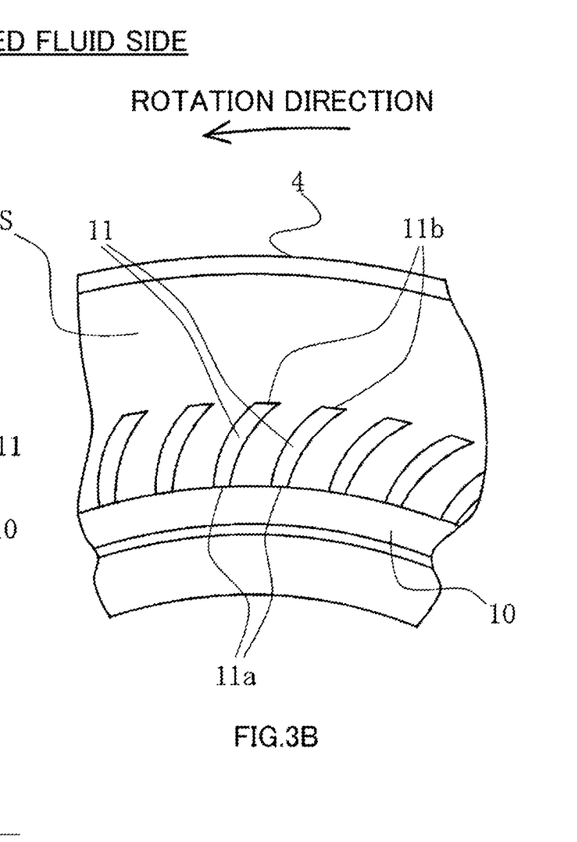
FIG. 3B is a cross-sectional view taken along arrow A-A.

With reference to FIGS. 1 to 3, a sliding component according to a first embodiment of the present invention will be described.

In the following embodiments, a mechanical seal, an example of a sliding component, will be described as an example. The outer peripheral side of the sliding parts constituting a mechanical seal is described as a sealed fluid side (liquid side or misty fluid side), and the inner peripheral side as a leakage side (gas side). The present invention, however, is not limited to this, and is also applicable to a case where the outer peripheral side is the leakage side (gas side) and the inner peripheral side is the sealed fluid side (liquid side or misty fluid side). As for the pressure magnitude relationship between the sealed fluid side (liquid side or misty fluid side) and the leakage side (gas side), for example, the sealed fluid side (liquid side or misty fluid side) may be under a high pressure and the leakage side (gas side) under a low pressure, and vice versa, or both sides may be under the same pressure.

FIG. 1 is a vertical cross-sectional view showing an example of a mechanical seal, which is an inside mechanical seal in a form of sealing sealed fluid tending to leak from the outer periphery of sliding faces toward the inner periphery, e.g. lubricating oil used for a bearing. The mechanical seal is provided, at a rotating shaft 2 to drive an impeller 1 of a compressor provided in a turbocharger, with a rotating-side seal ring 4 in an annular shape, one sliding part, provided in a state of being rotatable with the rotating shaft 2 in an integrated manner via a sleeve 3, and at a housing 5, with a stationary-side seal ring 7 in an annular shape, the other sliding part, provided in a non-rotating state and in an axially movable state via a cartridge 6. By a coiled wave spring 8 axially urging the stationary-side seal ring 7, the rotating-side seal ring 4 and the stationary-side seal ring 7 slide in close contact with each other on sliding faces S mirror-finished by lapping or the like. That is, in the mechanical seal, the rotating-side seal ring 4 and the stationary-side seal ring 7 each have the sliding face S formed radially, and prevent, at each other's sliding faces S, sealed fluid, e.g. liquid or misty fluid (hereinafter, liquid or misty fluid is sometimes referred to simply as "liquid") from flowing out from the outer periphery of the sliding faces S to the leakage side, the inner peripheral side.

Reference numeral 9 denotes an O-ring that seals a space between the cartridge 6 and the stationary-side seal ring 7.

In this example, a case where the sleeve 3 and the rotating-side seal ring 4 are separate is described, but the present invention is not limited to this. The sleeve 3 and the rotating-side seal ring 4 may be integrally formed.

The materials of the rotating-side seal ring 4 and the stationary-side seal ring 7 are selected from silicon carbide (SiC) excellent in wear resistance, carbon excellent in self-lubricity, and the like. For example, both of them may be SiC, or a combination of one of them being SiC and the other being carbon is possible.

FIG. 2A shows enlarged sliding portions of the sliding parts according to the first embodiment of the present invention.

In FIG. 2A, the sliding face S of the rotating-side seal ring 4 is provided, along its entire circumference, with a trap groove 10 located on the leakage side and spaced from the leakage side by a land R1, for trapping leakage liquid. The sliding face S of the rotating-side seal ring 4 is also provided with at least one dynamic pressure generation groove 11 configured to communicate with the trap groove 10 and not to communicate with the sealed fluid side.

The trap groove 10 and the dynamic pressure generation groove 11 is provided in the sliding face S of the rotating-side seal ring 4. However, the present invention is not limited to this. The grooves 10 and 11 may be provided in a sliding face of at least one of the pair of sliding parts, and may be provided in the sliding face S of the stationary-side seal ring 7, for example.

The trap groove 10 is a groove for trapping leakage liquid when leakage of liquid, sealed fluid, occurs at the time of face-opening of the sliding faces S of the rotating-side seal ring 4 and the stationary-side seal ring 7 due to vibrations at the time of unsteady operation of the device (e.g. a compressor) or the like. The leakage liquid trapped in the trap groove 10 is returned to the sealed fluid side by the action of the dynamic pressure generation groove 11 or the centrifugal force of leakage liquid or the like at the time of steady rotation.

In FIG. 2A, the trap groove 10 is rectangular-shaped in cross section, but is not limited to this. As shown in FIG. 2B, for example, the trap groove 10 may be of a flask-like shape widening from the inlet toward the recess. The flask-like trap groove 10 can trap leakage liquid in a widening portion on the recess side when the sliding component is mounted transversely. It is essential only that the shape of the trap groove 10 have a capacity to be able to trap leakage liquid.

The at least one dynamic pressure generation groove 11 is a groove for sucking fluid on the leakage side and pumping it to the sealed fluid side, and is formed into a spiral shape as shown in FIG. 3B, for example.

The spiral dynamic pressure generation grooves 11 communicate with the trap groove 10 at inlets 11a on the inner peripheral side (leakage side), but do not communicate with the sealed fluid side at ends 11b on the sealed fluid side, and are inclined in a spiral fashion to exert pumping action from the ends on the leakage side to the ends on the sealed fluid side by relative sliding of the rotating-side seal ring 4 and the stationary-side seal ring 7, to generate dynamic pressure (positive pressure).

In FIG. 3B, the spiral dynamic pressure generation grooves 11 are formed with a fixed groove width. Alternatively, the groove width of the inlets 11a on the inner peripheral side (leakage side) communicating with the trap groove 10 may be enlarged, that is, the circumferential length of the inlets 11a may be made longer than that of the other portions to increase the effect of feeding fluid into the dynamic pressure generation grooves 11.

In a high-speed rotation state of the rotating-side seal ring 4 such as in steady operation, through the spiral dynamic pressure generation grooves 11, gas is sucked from the leakage side, generating dynamic pressure (positive pressure) in the vicinity of the ends 11b on the outer peripheral side, so that a slight gap is formed between the sliding faces S of the rotating-side seal ring 4 and the stationary-side seal ring 7, bringing the sliding faces S into a state of gas lubrication and very low friction. At the same time, liquid in the trap groove 10 and gas on the leakage side are pumped toward the outer peripheral side, so that the liquid in the trap groove 10 and the liquid on the outer peripheral side are prevented from leaking to the inner peripheral side. Since the spiral dynamic pressure generation grooves 11 are spaced from the outer peripheral side by a land R, leakage does not occur during rest.

A dust entry reduction means 12 for reducing the entry of dust from the leakage side while allowing the passage of fluid is formed between the land R1 of the rotating-side seal ring 4 on the leakage side of the trap groove 10 and a land R2 of the stationary-side seal ring 7 on the leakage side of the sliding face S.

In this example, an extremely small gap zone g formed between the land R1 on the side of the rotating-side seal ring 4 and the land R2 on the side of the stationary-side seal ring 7 constitutes the dust entry reduction means 12. The gap of the extremely small gap zone g desirably has a size to prevent the entry of particles constituting dust while allowing the entry of liquid, and is preferably 0.5 mm or less, for example. The size of 0.5 mm or less includes zero, and its meaning is as follows.

When the device is at rest, that is, when the sliding parts are at rest, no gap is present between the pair of sliding faces, and the gap of the extremely small gap zone g is zero. When the device starts and the pair of sliding faces relatively slide, fluid present between the sliding faces generates dynamic pressure, forming a slight gap between the pair of sliding faces, and the gap of the extremely small gap zone g has a finite value. That is, the gap "0.5 mm or less" of the extremely small gap zone g represents a value when the sliding parts are at rest, and includes zero.

When the gap of the extremely small gap zone g is set at a finite value, the extremely small gap zone g may be provided along the entire circumference, or may be provided only at part of the circumference. As an instance where the extremely small gap zone g is provided only at part of the circumference, six extremely small gap zones g with a central angle within 30° are evenly spaced, and the other remaining portions are set to zero gap (zero gap during rest), for example.

As clearly shown in FIG. 3A in particular, an edge portion 13 of the land R1 of the rotating-side seal ring 4 on the leakage side of the trap groove 10, which forms the extremely small gap zone g, is chamfered, and an edge portion 14 of the land R2 on the side of the stationary-side seal ring 7 opposite to the chamfered edge portion 13 is also chamfered. The two chamfered edge portions 13 and 14 form the extremely small gap zone g. The extremely small gap zone g communicates with the trap groove 10 on the leakage side of the trap groove 10.

As described above, the dust entry reduction means 12 is disposed on the leakage side of the trap groove 10, so that the entry of dust into the trap groove 10 is prevented first. If dust should enter the trap groove 10, most of it remains in the trap groove 10 groove, and is substantially prevented from entering the sliding faces S.

The configuration in the first embodiment described above achieves the following effects:

(1) The sliding face S of the rotating-side seal ring 4, at least one sliding part of the pair of sliding parts, is provided, along its entire circumference, with the trap groove 10 for trapping leakage liquid, located on the leakage side and spaced from the leakage side by the land R1. The dust entry reduction means 12 for reducing the entry of dust from the leakage side while allowing the passage of fluid is formed between the lands R1 and R2 of the rotating-side seal ring 4 and the stationary-side seal ring 7, the pair of sliding parts, on the leakage side of the trap groove 10. Consequently, even when the sliding faces of the rotating-side seal ring 4 and the stationary-side seal ring 7 open due to vibrations at the time of unsteady operation of the device or the like, leakage liquid can be trapped by the trap groove 10, so that liquid leakage to the leakage side can be prevented, and the entry of dust from the leakage side into the sliding faces can be reduced, and thus friction and leakage at the sliding faces can be reduced.

(2) The extremely small gap zone g formed between the lands of the pair of sliding parts on the leakage side of the trap groove 10 constitutes the dust entry reduction means 12, so that a simple configuration can reduce the entry of dust from the leakage side into the sliding faces.

(3) The sliding face S of the rotating-side seal ring 4 is provided with the dynamic pressure generation grooves 11 configured to communicate with the trap groove 10 and not to communicate with the sealed fluid side, to suck gas from the inlets 11a on the inner peripheral side (leakage side), generating dynamic pressure (positive pressure) in the vicinity of the ends 11b on the outer peripheral side in a high-speed rotation state of the rotating-side seal ring 4 such as in steady operation, so that a slight gap is formed between the sliding faces S of the rotating-side seal ring 4 and the stationary-side seal ring 7, bringing the sliding faces S into a state of gas lubrication and very low friction. At the same time, through the spiral dynamic pressure generation grooves 11, gas on the inner peripheral side and liquid in the trap groove 10 are pumped toward the outer peripheral side, thus preventing the liquid in the trap groove 10 and liquid on the outer peripheral side from leaking to the inner peripheral side. Further, since the spiral dynamic pressure generation grooves 11 are spaced from the outer peripheral side by the land R, leakage does not occur during rest.

Second Embodiment

Figure 4:
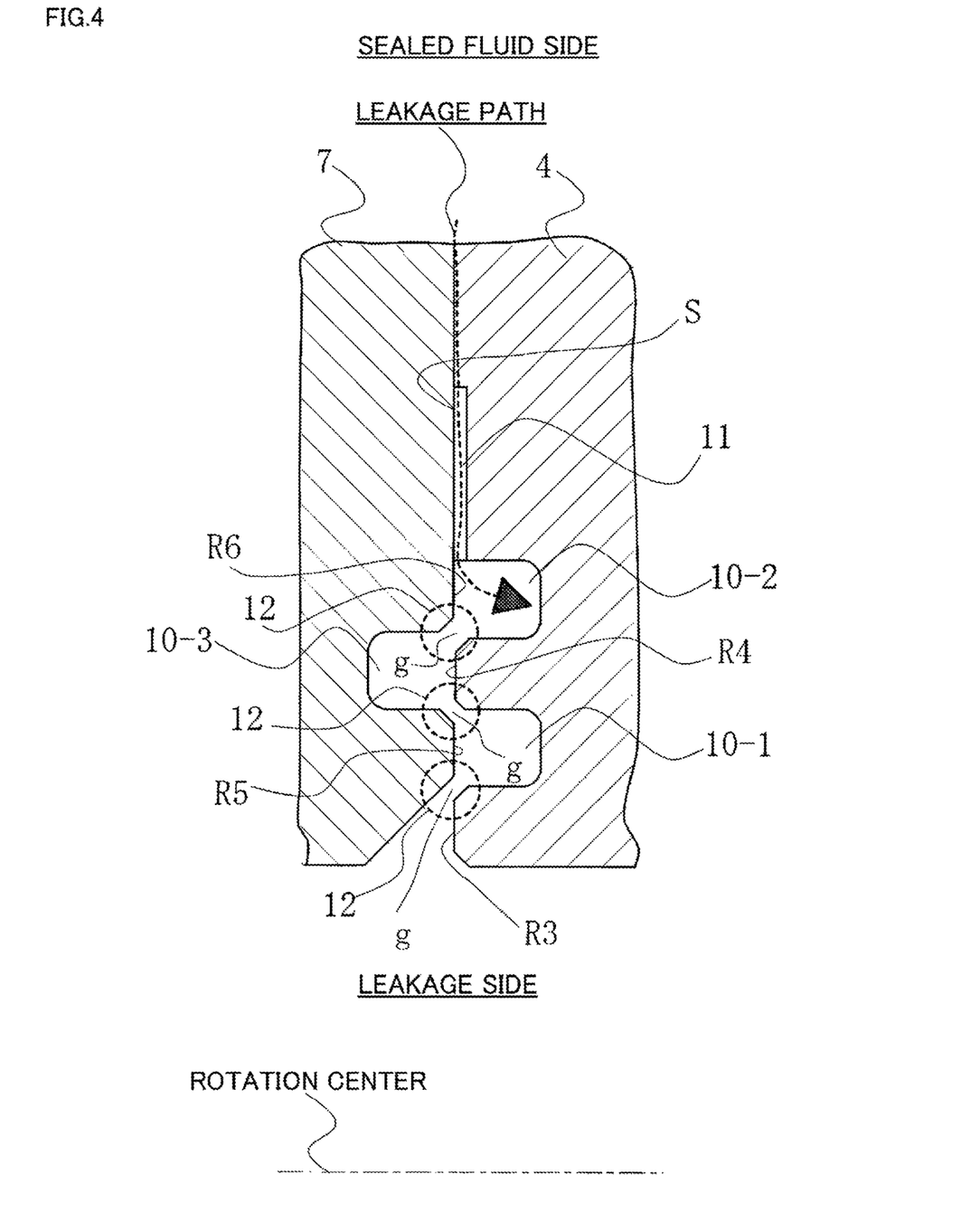
FIG. 4 is an enlarged view showing sliding portions of sliding parts according to a second embodiment of the present invention, with a rotation center positioned horizontally in a lower part of the sheet.

With reference to FIG. 4, a sliding component according to a second embodiment of the present invention will be described.

The sliding component according to the second embodiment is different from the sliding component in the first embodiment in that a plurality of trap grooves is provided in a sliding face of a rotating-side seal ring and one trap groove is provided in a sliding face of a stationary-side seal ring, but the other basic configuration is identical to that in the first embodiment. The same members are provided with the same reference numerals and letters to omit redundant descriptions.

In FIG. 4, a sliding face S of a rotating-side seal ring 4 is provided, along its entire circumference, with a trap groove 10-1 for trapping leakage liquid, located on the leakage side and spaced from the leakage side by a land R3, and a trap groove 10-2 for trapping leakage liquid, located on the sealed fluid side of the trap groove 10-1 and spaced from the trap groove 10-1 by a land R4 toward the side opposite to the leakage side. The sliding face S of the rotating-side seal ring 4 is also provided with at least one dynamic pressure generation groove 11 configured to communicate with the trap groove 10-2 provided away from the leakage side and not to communicate with the sealed fluid side.

A sliding face S of a stationary-side seal ring 7 is provided, along its entire circumference, with a trap groove 10-3 for trapping leakage liquid, located on the leakage side and spaced from the leakage side by a land R5. The trap groove 10-3 on the side of the stationary-side seal ring 7 is disposed to be located in between the two trap grooves 10-1 and 10-2 on the side of the rotating-side seal ring 4 so as not to radially overlap them. The side of the trap groove 10-3 opposite to the leakage side is defined by a land R6.

The number of trap grooves is not limited to two in the rotating-side seal ring 4 and one in the stationary-side seal ring 7 as described above. It is only necessary that a plurality of trap grooves be provided in one of the stationary-side seal ring 7 and the rotating-side seal ring 4 and at least one trap groove in the other, and the trap groove or grooves in the stationary-side seal ring 7 and the trap groove or grooves in the rotating-side seal ring 4 be arranged so as not to radially overlap with one another.

The trap grooves 10-1, 10-2, and 10-3 are grooves for trapping leakage liquid when leakage of liquid, sealed fluid, occurs at the time of face-opening of the sliding faces S of the rotating-side seal ring 4 and the stationary-side seal ring 7 due to vibrations at the time of unsteady operation of a compressor or the like. The leakage liquid trapped in the trap grooves 10-1, 10-2, and 10-3 is returned to the sealed fluid side at the time of steady rotation.

For the trap grooves 10-1, 10-2, and 10-3, contrary to the case shown in FIG. 4, the trap grooves 10-1 and 10-2 may be provided in a stationary-side seal ring, and the trap groove 10-3 in a rotating-side seal ring.

A dust entry reduction means 12 for reducing the entry of dust from the leakage side while allowing the passage of fluid is formed between the land R3 of the rotating-side seal ring 4 on the leakage side of the trap groove 10-1 and the land R5 of the stationary-side seal ring 7 on the leakage side of the sliding face S.

Further, dust entry reduction means 12, 12 are formed between the land R4 and the land R5 and between the land R4 and the land R6, respectively.

In this example, three extremely small gap zones g formed between the land R3 on the side of the rotating-side seal ring 4 and the land R5 on the side of the stationary-side seal ring 7 and between the land R4 on the side of the rotating-side seal ring 4 and the lands R5 and R6 on the side of the stationary-side seal ring 7 constitute the three dust entry reduction means 12, 12, 12. The gaps of the extremely small gap zones g desirably have such a size to prevent the entry of particles constituting dust while allowing the entry of liquid, and are preferably 0.5 mm or less, for example.

Each extremely small gap zone g may be provided along the entire circumference, or may be provided only at part of the circumference. As an instance where each is provided only at part of the circumference, six extremely small gap zones g with a central angle within 30° are evenly spaced, and the other remaining portions are set to zero gap, for example.

Edge portions of the lands R3, R4, R5, and R6 forming the extremely small gap zones g are chamfered, and the extremely small gap zones g are formed between the chamfered edge portions. The three trap grooves 10-1, 10-2, and 10-3 communicate with the leakage side through the three extremely small gap zones g.

The configuration in the second embodiment described above achieves the following effects:

(1) The trap grooves 10-1, 10-2, and 10-3 are individually provided in the stationary-side seal ring 7 and the rotating-side seal ring 4, the trap groove 10-3 in the stationary-side seal ring 7 and the trap grooves 10-1 and 10-2 in the rotating-side seal ring 4 are arranged so as not to radially overlap with one another, and the dust entry reduction means 12 for reducing the entry of dust from the leakage side while allowing the passage of fluid are formed between the lands R3, R4, R5, and R6 defining the trap grooves 10-1, 10-2, and 10-3, so that even when the sliding faces of the rotating-side seal ring 4 and the stationary-side seal ring 7 open due to vibrations at the time of unsteady operation of the device or the like, leakage liquid can be trapped by the plurality of trap grooves and liquid leakage to the leakage side can be further prevented, and the entry of dust can be prevented by a plurality of dust entry reduction means and the entry of dust from the leakage side into the sliding faces can be further prevented.

(2) The sliding face S of the rotating-side seal ring 4 is provided with the dynamic pressure generation grooves 11 configured to communicate with the trap groove 10-2 and not to communicate with the sealed fluid side, so that in a high-speed rotation state of the rotating-side seal ring 4 such as in steady operation, gas is sucked from inlets 11a on the inner peripheral side (leakage side), generating dynamic pressure (positive pressure) in the vicinity of ends 11b on the outer peripheral side. Consequently, a slight gap is formed between the sliding faces S of the rotating-side seal ring 4 and the stationary-side seal ring 7, bringing the sliding faces S into a state of gas lubrication and very low friction. At the same time, the dynamic pressure generation grooves 11 of a spiral shape pumps gas on the inner peripheral side and liquid in the trap grooves 10 toward the outer peripheral side, thus preventing the liquid in the trap grooves 10 and liquid on the outer peripheral side from leaking to the inner peripheral side. Since the spiral dynamic pressure generation grooves 11 are spaced from the outer peripheral side by a land R, leakage does not occur during rest.

Third Embodiment

Figure 5A:
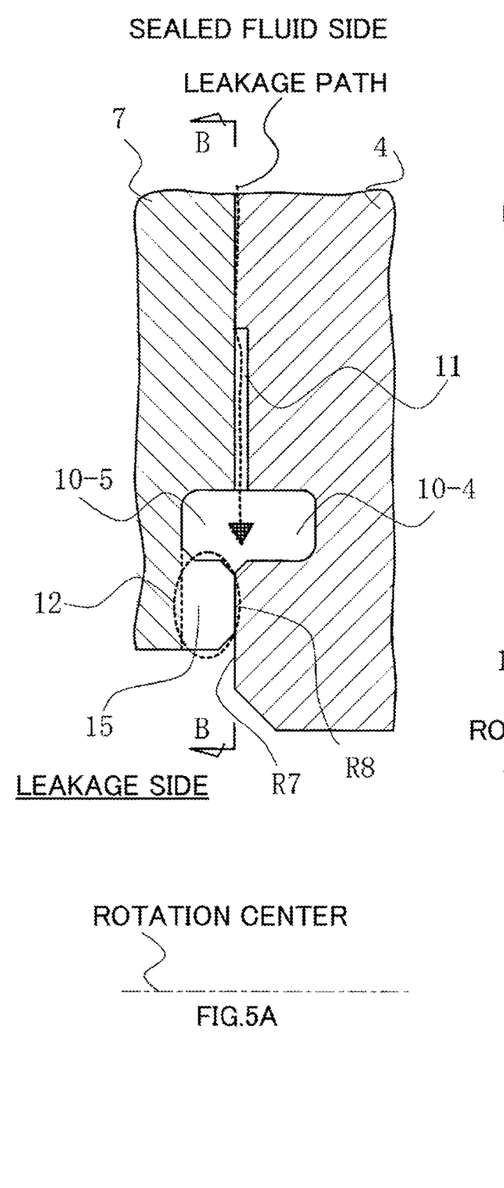
FIG. 5A is an enlarged view showing sliding portions of sliding parts according to a third embodiment of the present invention, with a rotation center positioned horizontally in a lower part of the sheet.
Figure 5B:
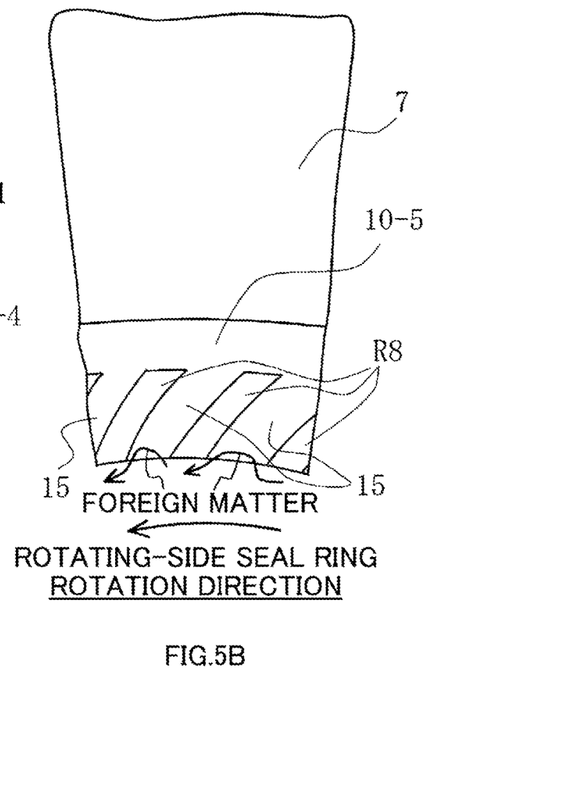
FIG. 5B is a cross-sectional view taken along arrow B-B.

With reference to FIG. 5, a sliding component according to a third embodiment of the present invention will be described.

The sliding component according to the third embodiment is different from the sliding component in the first embodiment in that a dust entry reduction means has radial inclined grooves formed in a surface of a land on the leakage side of a trap groove, but the other basic configuration is identical to that in the first embodiment. The same members are provided with the same reference numerals and letters to omit redundant descriptions.

In FIG. 5, a sliding face S of a rotating-side seal ring 4 is provided, along its entire circumference, with a trap groove 10-4 for trapping leakage liquid, located on the leakage side and spaced from the leakage side by a land R7. The sliding face S of the rotating-side seal ring 4 is also provided with at least one dynamic pressure generation groove 11 configured to communicate with the trap groove 10-4 and not to communicate with the sealed fluid side.

A sliding face S of a stationary-side seal ring 7 is provided, along its entire circumference, with a trap groove 10-5 for trapping leakage liquid, located on the leakage side and spaced from the leakage side by a land R8. The trap groove 10-5 on the side of the stationary-side seal ring 7 is disposed in radially the same position as the trap groove 10-4 on the side of the rotating-side seal ring 4.

The trap grooves 10-4 and 10-5 are for trapping leakage liquid when leakage of liquid, sealed fluid, occurs at the time of face-opening of the sliding faces S of the rotating-side seal ring 4 and the stationary-side seal ring 7 due to vibrations at the time of unsteady operation of a compressor or the like. Leakage liquid trapped in the trap grooves 10-4 and 10-5 is returned to the sealed fluid side at the time of steady rotation.

As shown in FIG. 5B, in a surface of the land R8 of the stationary-side seal ring 7, a plurality of radial inclined grooves 15 is formed to connect the trap groove 10-5 and the leakage side. In a case where the rotating-side seal ring 4 is rotated in a counterclockwise direction as shown by an arrow in FIG. 5B, the radial inclined grooves 15 are formed so as to be inclined in the counterclockwise direction from the trap groove 10-5. This resists the entry of foreign matter such as dust from the leakage side toward the sliding face.

The cross-sectional shape of the radial inclined grooves 15 may be changed radially. For example, the width and the depth of the cross section may be reduced on the leakage side and increased in a tapered shape toward the trap groove 10-5.

The radial inclined grooves 15 may be formed in the rotating-side seal ring 4 instead of in the stationary-side seal ring 7, or may be formed in both of them. The radial inclined grooves 15 may be provided along the entire circumference, or may be provided in a circumferential portion.

In this example, a surface of the land R7 of the rotating-side seal ring 4 and a surface of the land R8 of the stationary-side seal ring 7 are formed so as to be in contact with each other during rest. In the surface of the land R8 of the stationary-side seal ring 7, the radial inclined grooves 15 are formed.

In this example, the radial inclined grooves 15 formed in the surface of the land R8 on the leakage side of the trap groove 10-5 of the stationary-side seal ring 7 constitute the dust entry reduction means.

The configuration in the third embodiment described above achieves the following effects:

(1) The sliding face S of the rotating-side seal ring 4 is provided, along its entire circumference, with the trap groove 10-4 for trapping leakage liquid, located on the leakage side and spaced from the leakage side by the land R7. The sliding face S of the stationary-side seal ring 7 is provided, along its entire circumference, with the trap groove 10-5 for trapping leakage liquid, located on the leakage side and spaced from the leakage side by the land R8. The radial inclined grooves 15 constituting the dust entry reduction means for reducing the entry of dust from the leakage side while allowing the passage of fluid are formed between the lands R7, R8 on the leakage side of the trap grooves 10-4 and 10-5 of the rotating-side seal ring 4 and the stationary-side seal ring 7, a pair of sliding parts. Thus, even when the sliding faces of the rotating-side seal ring 4 and the stationary-side seal ring 7 open due to vibrations at the time of unsteady operation of the device or the like, the trap grooves 10-4 and 10-5 can trap leakage liquid, preventing liquid leakage to the leakage side, and the entry of dust from the leakage side into the sliding faces can be further reduced, and thus friction and leakage at the sliding faces can be reduced.

(2) The sliding face S of the rotating-side seal ring 4 is provided with the dynamic pressure generation grooves 11 configured to communicate with the trap groove 10-4 and not to communicate with the sealed fluid side, so that in a high-speed rotation state of the rotating-side seal ring 4 such as in steady operation, gas is sucked from inlets 11a on the inner peripheral side (leakage side), generating dynamic pressure (positive pressure) in the vicinity of ends 11b on the outer peripheral side. Consequently, a slight gap is formed between the sliding faces S of the rotating-side seal ring 4 and the stationary-side seal ring 7, bringing the sliding faces S into a state of gas lubrication and very low friction. At the same time, through the dynamic pressure generation grooves 11 of a spiral shape, gas on the inner peripheral side and liquid in the trap grooves 10 are pumped toward the outer peripheral side, thus preventing the liquid in the trap grooves 10 and liquid on the outer peripheral side from leaking to the inner peripheral side. The spiral dynamic pressure generation grooves 11 are spaced from the outer peripheral side by a land R, so that leakage does not occur during rest.

Fourth Embodiment

Figure 6A:
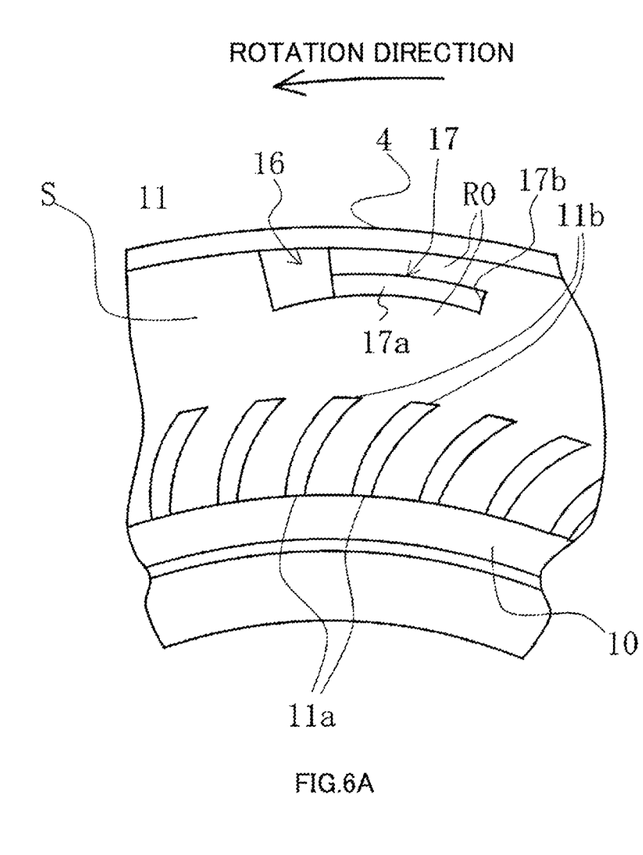
FIGS. 6A and 6B each show an enlarged part of a sliding face of a sliding part according to a fourth embodiment of the present invention, corresponding to FIG. 3B in the first embodiment (FIGS. 6A and 6B are different in the shape of a fluid introduction groove).
Figure 6B:
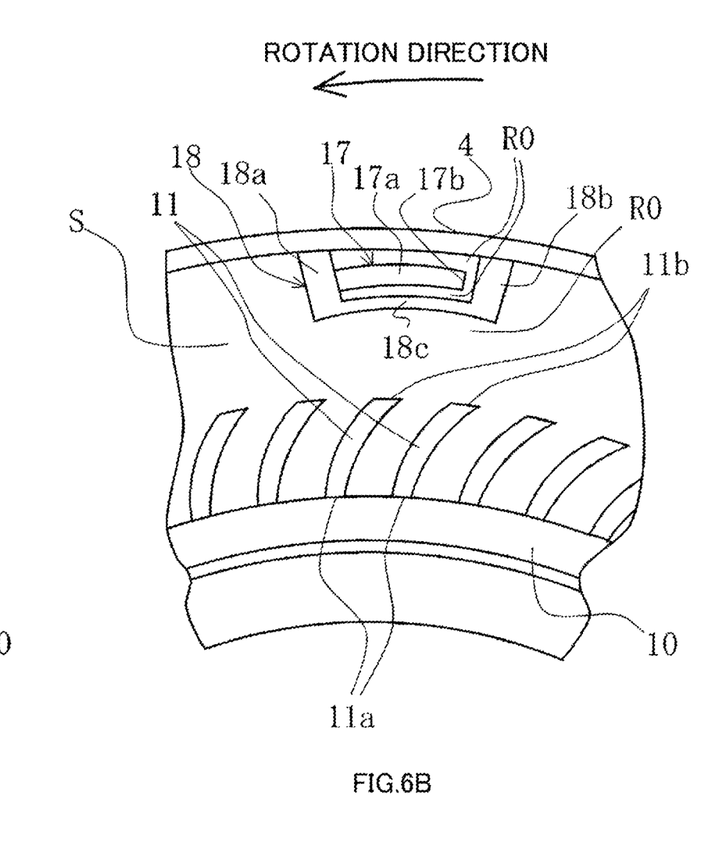

With reference to FIGS. 6A and 6B, a sliding component according to a fourth embodiment of the present invention will be described (FIGS. 6A and 6B are different in the shape of a fluid introduction groove).

The sliding component according to the fourth embodiment is different from those in the above embodiments in that a sliding face of at least one sliding part of a pair of sliding parts is provided with a fluid introduction groove and a positive pressure generation mechanism, but the other basic configuration is identical to those in the above embodiments. The same members are provided with the same reference numerals and letters to omit redundant descriptions.

In FIG. 6A, a sliding face S of a rotating-side seal ring 4 is provided with at least one fluid introduction groove 16 configured to communicate with a peripheral edge of the sliding face S on the sealed fluid side, i.e. the outer peripheral side, and not to communicate with a peripheral edge on the leakage side, i.e. the inner peripheral side.

The at least one fluid introduction groove 16 is disposed along the peripheral edge on the outer peripheral side and substantially rectangular-shaped in planar shape, communicates with the sealed fluid side at the peripheral edge of the sliding face S on the outer peripheral side, and is spaced from the inner peripheral side by a land R0.

The sliding face S of the rotating-side seal ring 4 is also provided with a positive pressure generation mechanism 17 with a positive pressure generation groove 17a that communicates with a circumferentially downstream end of the fluid introduction groove 16 and is shallower than the fluid introduction groove 16. The positive pressure generation mechanism 17 generates positive pressure (dynamic pressure), thereby increasing a fluid film between the sliding faces and improving lubrication performance.

The positive pressure generation groove 17a communicates with the fluid introduction groove 16 at its upstream end, and is spaced from the outer peripheral side by the land R0.

In this example, the positive pressure generation mechanism 17 is formed from a Rayleigh step mechanism having the positive pressure generation groove 17a communicating with the fluid introduction groove 16 at its upstream end and a Rayleigh step 17b, but is not limited to this. It is essential only that it be a mechanism generating positive pressure.

In FIG. 6A, a planar shape formed by the fluid introduction groove 16 and the positive pressure generation mechanism 17 is substantially L-shaped.

Now, suppose the rotating-side seal ring 4 rotates in a counterclockwise direction. Liquid on the outer peripheral side is introduced from the substantially rectangular-shaped fluid introduction groove 16 into the sliding face, and the sliding face S can be lubricated. At that time, the positive pressure generation mechanism 17 generates positive pressure (dynamic pressure), so that a fluid film between the sliding faces is increased, and lubrication performance can be further improved.

During high-speed rotation of the rotating-side seal ring 4 such as during steady operation, the liquid introduced into the sliding face through the fluid introduction groove 16 is discharged by centrifugal force, and thus the liquid does not leak to the inner peripheral side, the leakage side.

FIG. 6B is different from FIG. 6A in that the shape of a fluid introduction groove is different, but otherwise identical to FIG. 6A.

In FIG. 6B, a sliding face S of a rotating-side seal ring 4 is provided with a fluid introduction groove 18 configured to communicate with a peripheral edge the sliding face S on the sealed fluid side, i.e. the outer peripheral side, and not to communicate with a peripheral edge on the leakage side, i.e. the inner peripheral side.

The fluid introduction groove 18 is disposed along the peripheral edge on the outer peripheral side, is formed of a fluid introduction portion 18a and a fluid discharge portion 18b that communicate only with the peripheral edge of the sliding face S on the outer peripheral side, and a fluid communication portion 18c circumferentially connecting them, and is spaced from the inner peripheral side by a land R0.

In this example, the fluid introduction portion 18a and the fluid discharge portion 18b are circumferentially spaced at a certain distance, each extending radially linearly, and thus the fluid introduction groove 18 is substantially U-shaped in planar shape.

A positive pressure generation mechanism 17 with a positive pressure generation groove 17a shallower than the fluid introduction groove 18 is provided in a portion enclosed by the fluid introduction groove 18 and the outer peripheral side. The positive pressure generation mechanism 17 generates positive pressure (dynamic pressure), thereby increasing a fluid film between the sliding faces and improving lubrication performance.

The positive pressure generation groove 17a communicates with the fluid introduction portion 18a at its upstream end, and is spaced from the fluid discharge portion 18b and the outer peripheral side by the land R0.

In this example, the positive pressure generation mechanism 17 is formed from a Rayleigh step mechanism having the positive pressure generation groove 17a communicating at its upstream end with the fluid introduction portion 18a of the fluid introduction groove 18 and a Rayleigh step 17*b*, but is not limited to this. It is essential only that it be a mechanism generating positive pressure.

Now, suppose the rotating-side seal ring 4 rotates in a counterclockwise direction. Liquid on the outer peripheral side is introduced into the sliding face from the fluid introduction portion 18*a* of the substantially U-shaped fluid introduction groove 18, and discharged to the outer peripheral side from the fluid discharge portion 18*b*. At that time, liquid present on the outer peripheral side of the sliding face S can be actively introduced into the sliding face S in a low-speed rotation state of the rotating-side seal ring 4 such as at the time of startup, to lubricate the sliding face S. At that time, the positive pressure generation mechanism 17 generates positive pressure (dynamic pressure), so that a fluid film between the sliding faces is increased, and lubrication performance can be further improved.

During high-speed rotation of the rotating-side seal ring 4 such as during steady operation, the liquid introduced into the sliding face through the fluid introduction groove 18 is discharged by centrifugal force, and thus the liquid does not leak to the inner peripheral side, the leakage side.

In FIG. 6B, the fluid introduction groove 18 is substantially U-shaped in planar shape, but is not limited to this. It may be formed in such a shape that the fluid introduction portion 18*a* and the fluid discharge portion 18*b* converge on the inner peripheral side, i.e. substantially a V shape.

The configuration in the fourth embodiment described above achieves the following effects in addition to the effects in the first to third embodiments.

The sliding face S of the rotating-side seal ring 4 is provided with the fluid introduction groove 16 or 18 configured to communicate with the peripheral edge of the sliding face S on the sealed fluid side, i.e. the outer peripheral side, and not to communicate with the peripheral edge on the leakage side, i.e. the inner peripheral side, so that liquid present on the outer peripheral side of the sliding face S can be actively introduced into the sliding face S in the low-speed rotation state of the rotating-side seal ring 4 such as at the time of startup, to lubricate the sliding face S. At that time, the positive pressure generation mechanism 17 generates positive pressure (dynamic pressure), so that a fluid film between the sliding faces is increased, and lubrication performance can be further improved.

During high-speed rotation of the rotating-side seal ring 4 such as during steady operation, the liquid introduced into the sliding face through the fluid introduction groove 16 or 18 is discharged by centrifugal force, and thus the liquid does not leak to the inner peripheral side, the leakage side.

Although the embodiments of the present invention have been described above with reference to the drawings, a specific configuration is not limited to these embodiments. Any changes and additions made without departing from the scope of the present invention are included in the present invention.

For example, although the above embodiments have illustrated an example where a sliding part is used as one of a pair of a rotating seal ring and a stationary seal ring in a mechanical seal device, it can also be used as a bearing sliding part that slides on a rotating shaft while sealing lubricating oil against axially one side of a cylindrical sliding surface.

Further, for example, although the above embodiments have described the outer peripheral side of a sliding part as the sealed fluid side (liquid side or misty fluid side), and the inner peripheral side as the leakage side (gas side), the present invention is not limited to this. The present invention is also applicable to a case where the outer peripheral side is the leakage side (gas side), and the inner peripheral side is the sealed fluid side (liquid side or misty fluid side). As for the pressure magnitude relationship between the sealed fluid side (liquid side or misty fluid side) and the leakage side (gas side), for example, the sealed fluid side (liquid side or misty fluid side) may be under a high pressure and the leakage side (gas side) under a low pressure, and vice versa, or both sides may be under the same pressure.

Further, for example, the above embodiments have illustrated a case where the dynamic pressure generation grooves 11 are spiral grooves, but the present invention is not limited to this. Each may be a combination of a Rayleigh step and a reverse Rayleigh step. It is essential only that they be mechanisms generating dynamic pressure (positive pressure) by sucking fluid on the leakage side.

Further, for example, the forth embodiment has illustrated a case where a fluid introduction groove is provided in a sliding part in the first embodiment, but the present invention is not limited to this. It is also applicable to sliding parts in the second and third embodiments as a matter of course.

REFERENCE SIGN LIST

1 impeller
2 rotating shaft
3 sleeve
4 rotating-side seal ring
5 housing
6 cartridge
7 stationary-side seal ring
8 coiled wave spring
10, 10-1 to 10-5 trap groove
11 dynamic pressure generation groove
11*a* inlet on the inner peripheral side
11*b* end on the outer peripheral side
12 dust entry reduction means
13 land edge portion
14 edge portion of a land
15 radial inclined groove
16 fluid introduction groove
17 positive pressure generation mechanism
18 fluid introduction groove
S sliding face
R0 to R8 land
g extremely small gap zone

The invention claimed is:

1. A sliding component comprising a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking, wherein the sliding face of at least one sliding part of the pair of sliding parts is provided, along an entire circumference thereof, with at least one trap groove located close to a leakage side but spaced from the leakage side by a land, for trapping leakage fluid, a dust entry reduction means is formed between lands of the pair of sliding parts at a position closer to the leakage side than is the at least one trap groove, for reducing entry of dust from the leakage side while allowing passage of fluid, and the lands of the pair of sliding part have, at edges of the lands, chamfered portions, respectively, wherein the dust entry reduction means is constituted by an extremely small gap zone formed by the chamfered portions facing each other in a manner reducing entry of dust from the leakage side while allowing passage of fluid.

2. The sliding component according to claim 1, wherein the at least one trap groove comprises a plurality of trap grooves provided in one of the stationary-side seal ring and the rotating-side seal ring and at least one trap groove provided in the other of the stationary-side seal ring and the rotating-side seal ring, and
the trap groove or grooves in the stationary-side seal ring and the trap groove or grooves in the rotating-side seal ring are arranged so as not to radially overlap with one another, and the trap grooves are defined by lands between which dust entry reduction means are formed for reducing entry of dust from the leakage side while allowing passage of fluid.

3. The sliding component according to claim 2, wherein the sliding face of at least one sliding part of the pair of sliding parts is further provided with at least one dynamic pressure generation groove that is configured to communicate with the at least one trap groove and not to communicate with a sealed fluid side.

4. The sliding component according to claim 1, wherein the sliding face of at least one sliding part of the pair of sliding parts is further provided with at least one dynamic pressure generation groove that is configured to communicate with the at least one trap groove and not to communicate with a sealed fluid side.

5. The sliding component according to claim 4, wherein the at least one dynamic pressure generation groove is formed in a spiral shape to suck fluid on the leakage side and pump the fluid to the sealed fluid side.

6. The sliding component according to claim 1, wherein the sliding face of at least one sliding part of the pair of sliding parts is provided with at least one fluid introduction groove that is configured to communicate with the sealed fluid side and not to communicate with the leakage side.

7. A sliding component comprising a pair of sliding parts that relatively slide on each other, one of the sliding parts being a stationary-side seal ring, the other of the sliding parts being a rotating-side seal ring, the seal rings each having a sliding face formed radially for sealing liquid or misty fluid, which is sealed fluid, from leaking, wherein
the sliding face of at least one sliding part of the pair of sliding parts is provided, along an entire circumference thereof, with at least one trap groove located close to a leakage side but spaced from the leakage side by a land, for trapping leakage liquid,
a dust entry reduction means is formed between lands of the pair of sliding parts at a position closer to the leakage side than is the at least one trap groove, for reducing entry of dust from the leakage side, and
the lands of the pair of sliding part have, at edges of the lands, chamfered portions, respectively, wherein the dust entry reduction means is constituted by an extremely small gap zone formed by the chamfered portions facing each other in a manner reducing entry of dust from the leakage side.

8. The sliding component according to claim 7, wherein the at least one trap groove comprises a plurality of trap grooves provided in one of the stationary-side seal ring and the rotating-side seal ring and at least one trap groove provided in the other of the stationary-side seal ring and the rotating-side seal ring, and
the trap groove or grooves in the stationary-side seal ring and the trap groove or grooves in the rotating-side seal ring are arranged so as not to radially overlap with one another, and the trap grooves are defined by lands between which dust entry reduction means are formed for reducing entry of dust from the leakage side while allowing passage of fluid.

9. The sliding component according to claim 7, wherein the sliding face of at least one sliding part of the pair of sliding parts is further provided with at least one dynamic pressure generation groove that is configured to communicate with the at least one trap groove and not to communicate with a sealed fluid side.

10. The sliding component according to claim 7, wherein the sliding face of at least one sliding part of the pair of sliding parts is provided with at least one fluid introduction groove that is configured to communicate with the sealed fluid side and not to communicate with the leakage side.

11. A sliding component comprising a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking, wherein
the sliding face of at least one sliding part of the pair of sliding parts is provided, along an entire circumference thereof, with at least one trap groove located close to a leakage side but spaced from the leakage side by a land, for trapping leakage fluid,
a dust entry reduction means is formed between lands of the pair of sliding parts at a position closer to the leakage side than is the at least one trap groove, for reducing entry of dust from the leakage side while allowing passage of fluid, and
the lands of the pair of sliding part have, at edges of the lands, chamfered portions, respectively, wherein the dust entry reduction means is constituted by radial inclined grooves which are formed in a surface of at least one of the lands of the pair of sliding parts and which are open to the at least one trap groove and the leakage side in a manner reducing entry of dust from the leakage side while allowing passage of fluid.

12. The sliding component according to claim 11, wherein the at least one trap groove comprises a plurality of trap grooves provided in one of the stationary-side seal ring and the rotating-side seal ring and at least one trap groove provided in the other of the stationary-side seal ring and the rotating-side seal ring, and
the trap groove or grooves in the stationary-side seal ring and the trap groove or grooves in the rotating-side seal ring are arranged so as not to radially overlap with one another, and the trap grooves are defined by lands between which dust entry reduction means are formed for reducing entry of dust from the leakage side while allowing passage of fluid.

13. The sliding component according to claim 11, wherein the sliding face of at least one sliding part of the pair of sliding parts is further provided with at least one dynamic pressure generation groove that is configured to communicate with the at least one trap groove and not to communicate with a sealed fluid side.

14. The sliding component according to claim 11, wherein the sliding face of at least one sliding part of the pair of sliding parts is provided with at least one fluid introduction groove that is configured to communicate with the sealed fluid side and not to communicate with the leakage side.

15. A sliding component comprising a pair of sliding parts that relatively slide on each other, one of the sliding parts being a stationary-side seal ring, the other of the sliding parts being a rotating-side seal ring, the seal rings each having a sliding face formed radially for sealing sealed fluid from leaking, wherein the sliding face of at least one sliding part of the pair of sliding parts is provided, along an entire circumference thereof, with at least one trap groove located close to a leakage side but spaced from the leakage side by a land, for trapping leakage fluid, a dust entry reduction means is formed between lands of the pair of sliding parts at a position closer to the leakage side than is the at least one trap groove, for reducing entry of dust from the leakage side, and the lands of the pair of sliding part have, at edges of the lands, chamfered portions, respectively, wherein the dust entry reduction means is constituted by radial inclined grooves which are formed in a surface of at least one of the lands of the pair of sliding parts and which are open to the at least one trap groove and the leakage side in a manner reducing entry of dust from the leakage side.

* * * * *